(12) United States Patent
Gangadharan et al.

(10) Patent No.: US 9,201,992 B2
(45) Date of Patent: Dec. 1, 2015

(54) METHOD AND APPARATUS USING FORMAL METHODS FOR CHECKING GENERATED-CLOCK TIMING DEFINITIONS

(71) Applicant: Synopsys, Inc., Mountain View, CA (US)

(72) Inventors: Sridhar Gangadharan, San Jose, CA (US); Barsneya Chakrabarti, Noida (IN); Manish Goel, Noida (IN); Mohammad H. Movahed-Ezazi, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 20 days.

(21) Appl. No.: 14/184,021

(22) Filed: Feb. 19, 2014

(65) Prior Publication Data
US 2015/0234959 A1    Aug. 20, 2015

(51) Int. Cl.
*G06F 9/455* (2006.01)
*G06F 17/50* (2006.01)

(52) U.S. Cl.
CPC ................... *G06F 17/5031* (2013.01)

(58) Field of Classification Search
CPC .............. G06F 17/5031; G06F 17/504; G06F 17/5022; G06F 17/505; G06F 2217/62; G06F 2217/78; G06F 2217/84
See application file for complete search history.

(56) References Cited

U.S. PATENT DOCUMENTS

| | | | |
|---|---|---|---|
| 6,564,360 B2 | 5/2003 | Chiu | |
| 6,859,026 B2 | 2/2005 | Hsi et al. | |
| 6,877,139 B2 | 4/2005 | Daga | |
| 7,299,433 B2 | 11/2007 | Clement et al. | |
| 7,669,165 B2 | 2/2010 | Pandey et al. | |
| 8,423,935 B1* | 4/2013 | Manovit et al. | 716/107 |
| 8,627,249 B1 | 1/2014 | Pandey et al. | |
| 8,645,117 B2* | 2/2014 | Yin et al. | 703/19 |
| 2003/0229483 A1* | 12/2003 | Boland et al. | 703/19 |
| 2005/0198606 A1* | 9/2005 | Gupta et al. | 716/18 |
| 2007/0271536 A1* | 11/2007 | Seawright et al. | 716/5 |
| 2008/0109777 A1* | 5/2008 | Morishita | 716/6 |
| 2008/0288904 A1* | 11/2008 | Rahim et al. | 716/6 |

OTHER PUBLICATIONS

Printout: A. Daga, "The Formal Verification of Design Contraints", Verification Horizons 9(1), Feb. 2013, pp. 29-33.
Printout: S. Churiwala, "Verifications and Generation of Constraints", Design & Reuse, Industry Articles 21289, Aug. 10, 2009, 6 pages.
Mohit Arora, "The Art of Hardware Architecture—2.4 Clocking Schemes", EETimes excerpt, Jan. 10, 2012, 11 pages.
Printout: A. Daga, "The Formal Verification of Design Contraints", FishTail Design Automation, Inc., Jan. 24, 2013, 7 pages.

* cited by examiner

*Primary Examiner* — Nha Nguyen
(74) *Attorney, Agent, or Firm* — Fenwick & West LLP

(57) ABSTRACT

A generated-clock checker compares timing definitions against a register transfer level description of the design using formal methods. The generated-clock checker derives generated-clock timing waveform models from the timing definitions, derives generated-clock waveform models from the register level design and then compares the waveform models using formal methods.

16 Claims, 4 Drawing Sheets

METHOD AND APPARATUS USING FORMAL METHODS FOR CHECKING GENERATED-CLOCK TIMING DEFINITIONS

TECHNICAL FIELD

This invention relates to the field of integrated circuits design timing verification and in particular to verification of clock timing definitions specified by a designer as part of the design constraints of an integrated circuit design. More particularly the invention relates to a system, method and computer program product for a generated-clock timing verification approach that uses formal methods.

BACKGROUND ART

Electronic chip designers use a variety of computer-aided design tools. After creating a register-transfer level design they typically use a static timing analysis tool to check for timing issues. The static timing analysis tool can predict setup and hold violations, give a performance estimates and indicate other timing issues. The static timing analysis tool requires the user to supply clock timing information. Chip designers typically specify the clock timing information in a format such as the Synopsys Design Constraint (SDC) language. If a user makes a mistake in the clock timing information the final chip may not work.

Modern electronic chip designers usually try to minimize the power requirement of the chips they develop. Designs contain many registers and each register value transition consumes power. Designers try to reduce the power consumption by reducing the frequency of register transitions. Power saving techniques include: a) running parts of the design at a lower clock frequencies; b) dynamically disabling the clock to a part of the design when the associated function is not required; and c) dynamically switching between clocks of different frequency. The design will typically contain one or more master clocks and multiple lower-frequency generated-clocks derived from the master clocks.

Atrenta's Spyglass Clk_Gen23 rule, as described in its Spyglass User Guide, checks structurally whether generated-clocks have been defined correctly and reports some incorrectly defined generated-clocks. It looks for specific components connected in specific ways. Since it performs structural checks it can handle only a limited number of logic structures. It is impossible to verify all forms of generated-clocks structurally as the involved logic can be complex and can have many different patterns. For example, a simple divide_by_2 generated-clock can be generated in many ways.

SUMMARY DISCLOSURE

A generated-clock checker software tool implemented in a programmable computing system compares, using formal methods, user-specified timing definitions against a register transfer level description of the integrated circuit design. A generated clock is a clock signal derived from a primary clock signal by using sequential and/or combinational logic. Accordingly, the generated-clock checker derives respective sets of generated clock timing waveform models both from the timing definitions and also from the register level design, and then compares those two sets of waveform models using formal methods. Any discrepancies are reported to the user (i.e. circuit designer).

The generated-clock checker receives a design file, user-specified clock timing definitions, and (optionally) reset conditions defining initial register states for the circuit design. For each generated clock in the timing definition, it identifies from the design file all possible logic paths from the master clock to that generated clock, ignoring unnecessary combinational logic (e.g., including only checking cases where the clock signal in the logic path is enabled), while keeping track of inversions in the path, as well as the effect on clock timing of register inputs and register outputs. Then for each of those identified logic paths, it matches a formal waveform model against timing definition statements, e.g. by generating a finite state machine (FSM) model for that path and generated clock and comparing the FSM against the timing definition statements, as by using a satisfiability checker in the tool. Any mismatched or missing waveform and/or timing definitions are reported and may be displayed for user visualization and any necessary correction of the timing definitions.

Formal methods rely on mathematically based techniques for analysis and verification. In the field of electronic design verification formal methods offer a more rigorous approach compared to ad hoc structural techniques. Formal verification methods are used to prove theorems, compare models, check logic equivalence and check logic assertions. One type of formal verification method is to compare canonical descriptions such as binary decision diagrams. Another type of formal verification uses a satisfiability checker. A satisfiability checker tests if there are a set of variable values that make a Boolean logic expression true.

DETAILED DESCRIPTION

The generated-clock checker (GCC) checks user-specified clock timing definitions against a register transfer level design. The GCC reads the user-specified clock timing definitions, the corresponding register transfer level design and reset conditions. The reset conditions define the initial values of the registers in the design. The GCC analyzes the design and generates a list of logic paths from master clocks to generated-clocks. The GCC keeps track of clock inversions but otherwise prunes out combinational logic that does not affect the clock waveform. The GCC ignores logic paths that the user has specified to ignore. The GCC constructs waveform models from the user-specified clock timing definitions and constructs waveform models from the register transfer level design. The GCC uses formal methods to compare the two sets of waveforms. The GCC reports matched, mismatched and missing generated-clock definitions. The GCC reports problem design paths giving the master clock name and generated-clock name. The GCC shows a schematic highlighting the problematic logic paths in the design. The GCC shows actual and expected waveforms.

Figure 1:
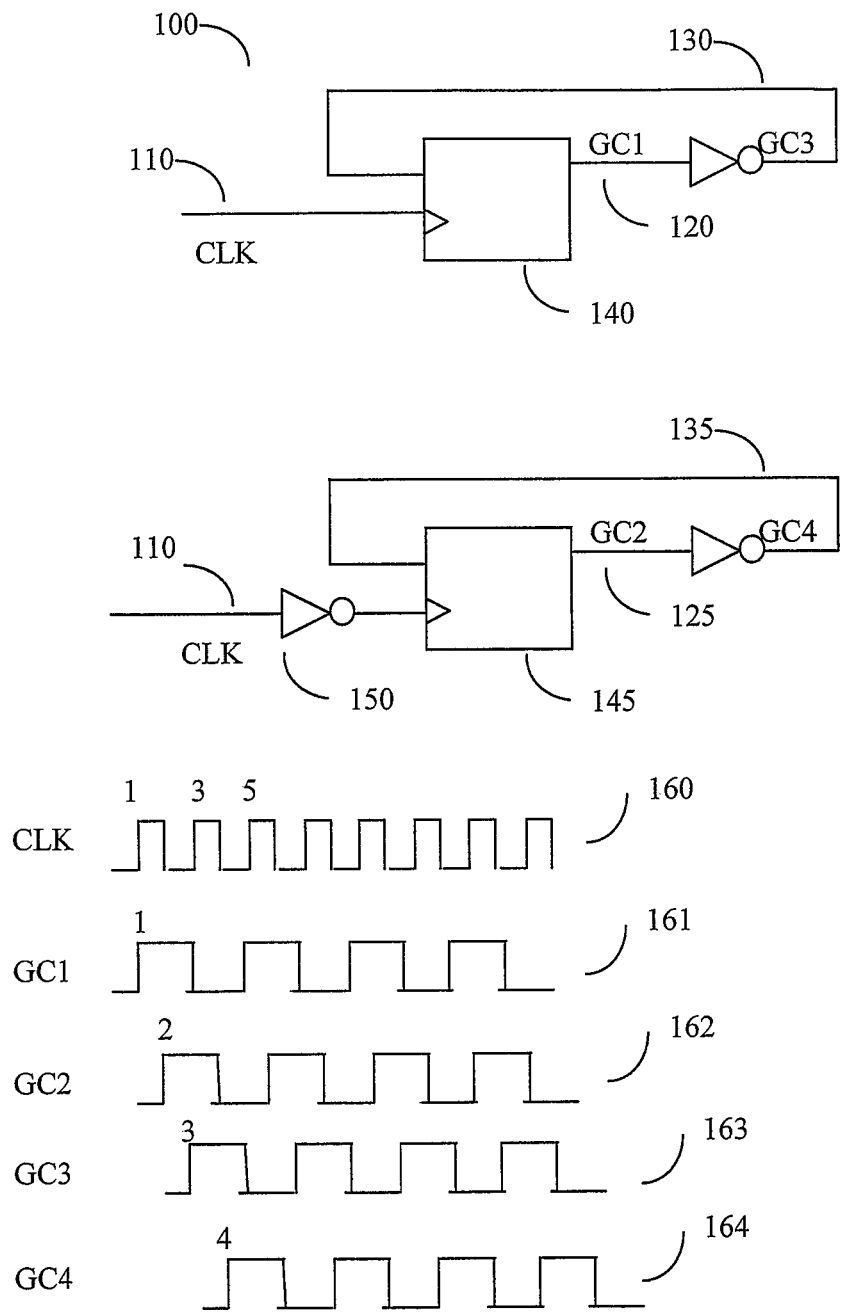
FIG. 1 shows the waveforms associated with different flavors of a simple divide-by-two generated-clock.

FIG. 1 is a diagram 100 showing two simple divide-by-2 generated-clock circuits and the associated waveforms. In the upper circuit master clock CLK 110 drives the clock pin of register 140. The inverted register output 130 feeds back to the data input of register 140. A generated-clock signal can be taken from GC1 120 and from GC3 130. In the lower circuit the master clock signal CLK 120 drives an inverter 150 before driving the clock pin of register 145. Generated-clock signals can be taken from GC2 125 or from GC4 135. The waveforms for CLK, GC1, GC2, GC3 and GC4 are shown at 160, 161, 162, 163, and 164 respectively. Waveforms GC1, GC2, GC3 and GC4 all have half the frequency of CLK. The CLK waveform 160 has rising edges at times 1, 3, 5, etc. The GC1 waveform 161 has rising edges at times 1, 5, 9, etc. The GC2 waveform 162 has rising edge times at 2, 6, 10, etc.

Using the SDC language a logic designer should define GC1, GC2, GC3 and GC4 using the following respective statements:

create_generated_clock -source CLK -divide_by 2 [get pins FF1/Q]
create_generated_clock -source CLK -edges {2 4 6} [get pins FF1/Q]
create_generated_clock -source CLK -divide_by 2 [get pins FF1/Q]-invert
create_generated_clock -source CLK -edges {4 6 8} [get pins FF1/Q]

The -edges argument specifies the times of the first three rising, falling and rising waveform edges with respect to the edge of the master clock. The -edges argument can be replaced with a -divide_by N argument if the first rising edge of the generated clock matches the first rising edge of the master clock. The -invert argument indicates that the waveform is inverted. The generated-clock statement frequently uses a "get pins" argument or a "get ports" argument to specify the source and/or output of the generated clock. The "get pins" argument specifies component pins and the "get ports" argument specifies ports. It is common for inexperienced logic designers to make a mistake in specifying the generated-clock timing.

Figure 2:
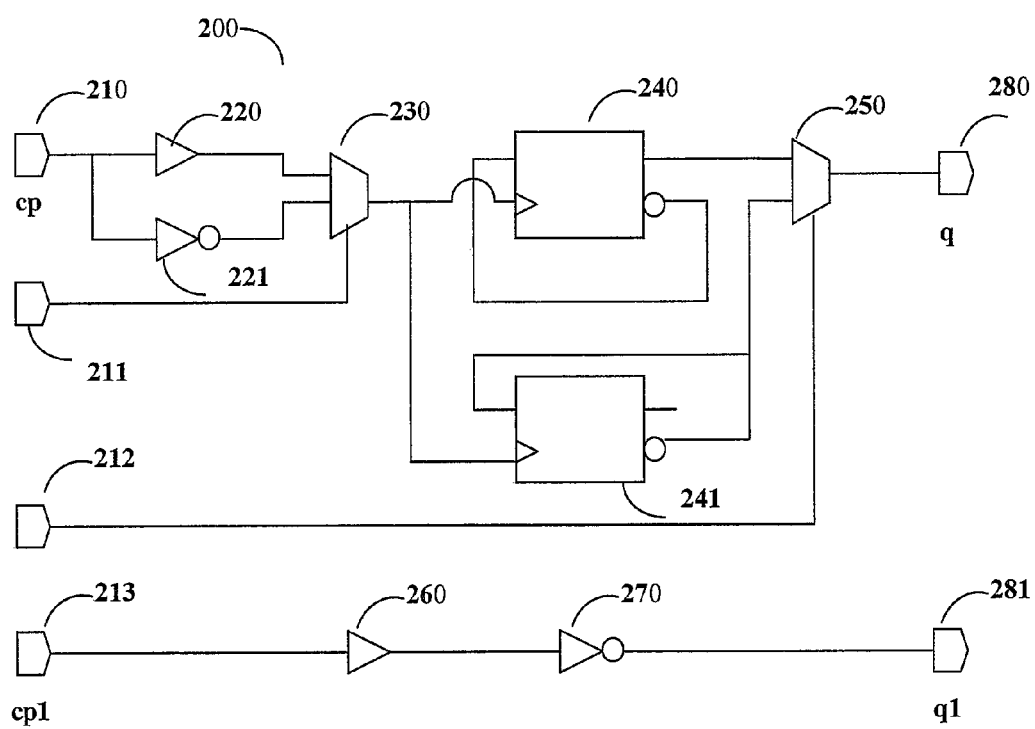
FIG. 2 shows a sample register level design with a divide-by-2 generated-clock using multiplexers and a divide-by-1 generated-clock using combinational logic.

FIG. 2 shows a sample design 200. The master clock signal cp 210 drives a buffer 220 and an inverter 221. A multiplexer (MUX) 230 selects between the output of the buffer 220 and the inverter 221. The MUX 230 drives the clock pins of registers 240 and 241. Registers 240 and 241 both have feedback from their inverted output causing a clock division by 2. The MUX 250 is driven by the output of register 240 and the inverted output of register 241. The MUX drives the generated-clock q 280. The master clock signal cp1 213 drives buffer 260 which drives inverter 270 which drives generated-clock q1 281.

The MUX 230 is controlled by a select signal 211 and MUX 250 is controlled by select signal 212. The logic designer usually wants a static timing analysis tool to check for timing violations using all possible sources of each MUX. The logic designer must normally define separate generated-clock waveforms for each MUX source. There are four logic paths from the master clock cp 210 to the generated-clock q 280. MUXes 230 and 250 select one of the four logic paths. The four logic paths correspond to the four logic paths discussed in FIG. 1. A logic designer can choose to ignore an input to a MUX by specifying a "set_case_analysis" SDC statement.

Suppose a logic designer provides the following SDC description:

create_clock -name CLK -period 10 cp
create_clock -name CLK1 -period 12 cp1
create_generated_clock -name GCLK -divide_by 2 [get_ports cp]
[get_ports q]-add -master_clock CLK
create_generated_clock -name GCLK1 -divide_by 2 [get_ports cp]
[get_ports q]-add -master_clock CLK -invert
create_generated_clock -name GCLK2 -edges {1 3 5}-source
[get_ports cp]
[get_ports q]-add -master_clock CLK
create_generated_clock -name GCLK3 -edges {2 4 6}-source
[get_ports cp]
[get_ports q]-add -master_clock CLK
create_generated_clock -name GCLK4 -divide_by 1 [get_ports q1]-source [get_ports cp1]

The create_clock statements define master clocks and specify the periods of their waveforms.

The GCC checks the SDC description against the sample design 200. It reports that generated-clocks GCLK, GCLK1, GCLK2 and GCLK3 all have correct SDC definitions. The GCC reports an error in the SDC definition of GCLK4 because the design has an inverter 270 between the master clock cp1 213 and the generated-clock q 281. The GCC reports that there is a missing generated-clock statement for generated-clock q 280 from master clock cp 210. The GCC specifies the missing generated-clock is for the path from master clock cp 210, inverter 221, register 241 and generated-clock q 280. The missing generated-clock waveform has edges {4 6 8}. The SDC definitions for GCLK and GCLK2 define the same waveform.

Figure 3:
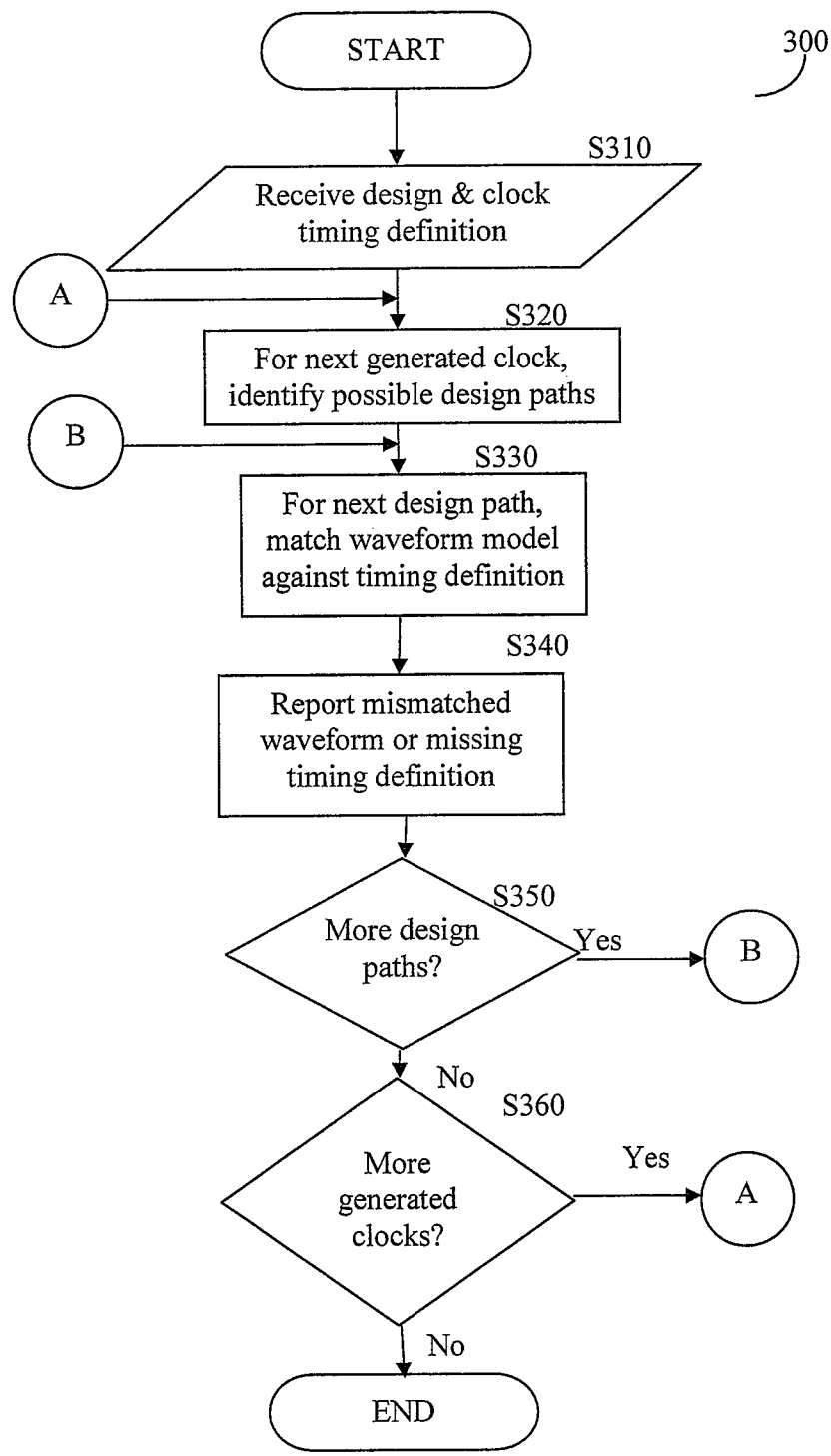
FIG. 3 shows a flowchart outlining the steps of the generated-clock checker.
Figure 5:
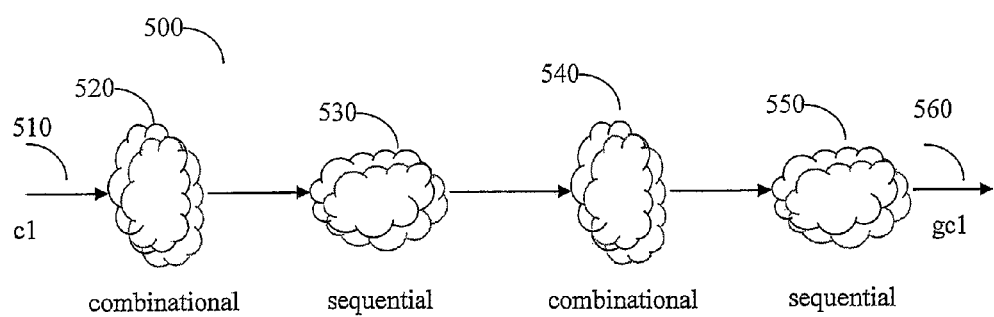
FIG. 5 shows combinational logic that the generated-clock checker ignores.

FIG. 3 is an exemplary and non-limiting flowchart 300 for checking generated-clock timing definitions. In S310 the GCC receives the design file, the user-specified timing definition and the reset conditions. In S320 the GCC treats the next generated clock and creates a list of all possible logic paths from the master clock to that generated-clock. On the first iteration the GCC treats the first generated-clock. On subsequent iterations the GCC selects the next generated clock. The GCC selects the generated-clock by looking at create_generated_clock statements in the timing definitions. In the above example there are two generated clocks specified as arguments to "get ports", namely q and q1. When constructing the logic paths the GCC ignores unnecessary combinational logic. For example the GCC ignores AND gates with a clock input and a combinational enable signal. Static timing analysis need only check the case when the clock signal is enabled. The GCC ignores logic paths that the user specifies to be ignored. For example if the user specifies a set_case_analysis SDC statement stating that only the first input of a MUX should be consider then the GCC will ignore the other MUX inputs. When constructing the logic path the GCC keeps track of inversions and keeps track of register input and register output pins. FIG. 5 shows a potential logic path. The GCC tracks inversions but otherwise prunes out combinational logic block 520. The GCC keeps track of logic in blocks 530, 540 and 550.

In S330 the GCC constructs finite-state-machine (FSM) models for the current generated clock. For each user-specified, generated-clock timing definition of the current generated-clock the GCC constructs a FSM corresponding to the specified waveform. For the next logic path of the design identified in S320 the GCC generates a FSM. On the first iteration of S330 the GCC treats the first logic path identified in S320. On subsequent iterations the GCC treats the next logic path identified in S320. The GCC compares the FSM from the current logic path of the design against the FSMs from the user-specified timing definition. The GCC compares FSMs using formal methods. In one embodiment the GCC uses a satisfiability checker to compare the FSMs. In S340 the GCC reports matching waveforms, mismatched waveforms and missing waveforms. If the GCC finds one unmatched design FSM and one unmatched user-specified, timing definition FSM for the current generated clock the GCC will report that that the corresponding design path does not match the corresponding timing definition. In S350 the GCC checks if there are more logic paths to treat. If there are more logic paths the GCC loops back to S330, otherwise the GCC proceeds to S360. In S360 the GCC checks if there are more generated clocks to treat. If there are more generated clocks the GCC loops back to S320, otherwise the GCC exits.

Figure 4:
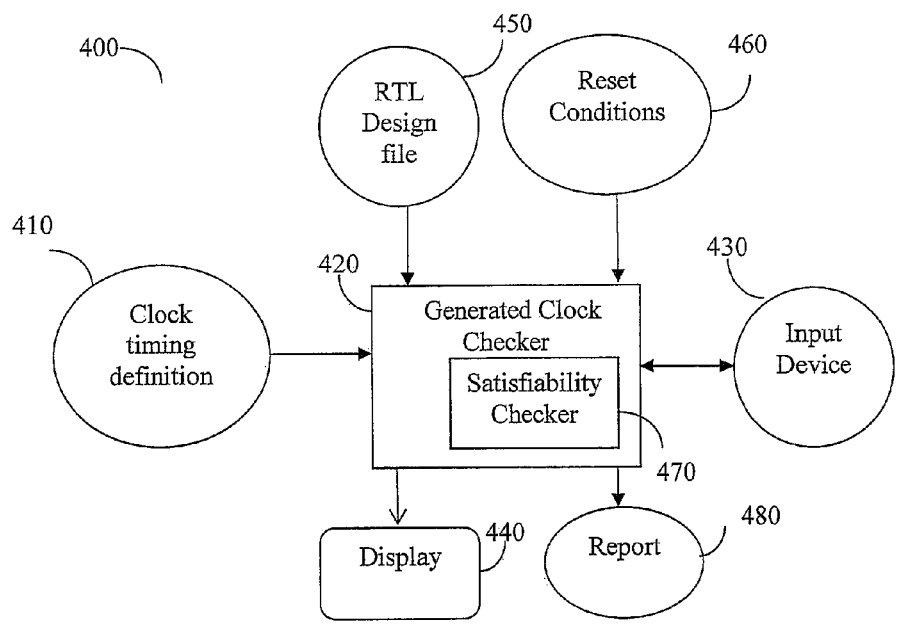
FIG. 4 shows a block diagram of a generated-clock checker.

FIG. 4 is an exemplary and non-limiting diagram 400 showing a generated-clock checker (GCC) 420. The GCC 420 runs as an application program on a central processing unit (CPU). In one embodiment the GCC is embedded in an application program that makes multiple checks. The GCC 420 interacts with a logic designer through an input device, 430 and a display, 440. The GCC 420 displays generated-clock checking results on the display, 440. A logic designer specifies GCC inputs, starts the GCC and views results using the input device, 430. A logic designer views a list of generated-clock issues on the display 440. Using the input device 430 the logic designer can request actual and user-defined waveforms and request a schematic showing a problematic logic path in the design. The GCC 420 reads a timing definition 410. In one embodiment the timing definition is contained in a file and uses the SDC language to define master clock and generated-clock waveforms. In another embodiment the GCC prompts the user to enter timing definitions. The GCC 420 reads a register transfer level design 450. The GCC 420 reads reset conditions 460 to determine the initial values of the registers in the register transfer level design 450. Many designs have a reset signal that drives a reset pin on the registers. The logic designer specifies a value to drive the reset line. The value on the reset line determines whether the register will be preset to 0 or 1. In one embodiment the GCC 420 embeds or interacts with a satisfiability checker 470. The satisfiability checker 470 verifies logic hypotheses. In one embodiment the GCC 420 stores the generated-clock checking results in a file as a report 480.

FIG. 5 shows a possible logic path from master clock c1 510 to generated-clock gc1 560. The master clock signal c1 510 passes through combinational logic 520, sequential logic 530, combinational logic 540, and sequential logic 550. The clock generation logic is contained in sequential logic 530, combinational logic 540, and sequential logic 550. The combinational logic block 520 does not modify the clock waveform unless it inverts the clock signal.

The embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A method implemented as a generated-clock checker tool in a programmable computing system for checking timing definitions of generated-clocks against a register-level design for an integrated circuit, the method comprising:
   constructing waveform models from both user-specified timing definitions and a register-level design for each generated clock, by considering all logic paths from a master clock to each generated-clock, and keeping track of any inversions in a logic path, while ignoring any combinational logic unrelated to clock generation, and generating finite state machines to represent the waveform models;
   comparing, using formal methods, the two sets of constructed waveform models obtained from the timing definitions and the register-level design, by using a satisfiability checker to compare the finite state machines; and
   reporting, by using the programmable computing system, any discrepancies found between the two sets of waveforms.

2. The method as in claim 1, wherein ignoring combinational logic assumes only cases where a clock signal is enabled in the considered logic path.

3. The method as in claim 1, when the constructing of the waveform models further ignores any logic paths that a user has indicated.

4. The method as in claim 1, wherein the considering of all logic paths also keeps track of register inputs and outputs.

5. The method as in claim 1, wherein the user specifies reset conditions that define initial values of registers in the design.

6. The method as in claim 1, wherein the generated-clock checker reports any mismatched generated-clock timing definitions.

7. The method as in claim 1, wherein the generated-clock checker reports any missing generated-clock timing definitions.

8. The method as in claim 1, wherein reporting any waveform discrepancies includes:
   displaying actual and expected waveforms and the related logic path between the master clock and the generated-clock.

9. A generated-clock checker software tool stored on a non-transitory storage media and running on a programmed computer for checking user-specified timing definitions of generated-clocks against a register-level design file for an integrated circuit, wherein the computer when running the generated-clock checker:
   accepts a timing definition file and a register-level design file from a user input interface or memory access;
   constructs sets of waveform models of each generated-clock both from the timing definition file and from the design file, by considering all logic paths from a master clock to each generated-clock, and keeping track of any inversions in a logic path, while ignoring any combinational logic unrelated to clock generation and generating finite state machines to represent the waveform models;
   compares the two constructed sets of waveforms using formal methods, by using a satisfiability checker to compare the finite state machines; and
   reports any discrepancies between the sets of waveforms.

10. The software tool running on a programmed computer as in claim 9, wherein ignoring combinational logic assumes only cases where a clock signal is enabled in the considered logic path.

11. The software tool running on a programmed computer as in claim 9, when the constructing of the waveform models further ignores any logic paths that a user has indicated.

12. The software tool running on a programmed computer as in claim 9, wherein the considering of all logic paths also keeps track of register inputs and outputs.

13. The software tool running on a programmed computer as in claim 9, wherein the user specifies reset conditions that define initial values of registers in the design.

14. The software tool running on a programmed computer as in claim 9, wherein the generated-clock checker reports any mismatched generated-clock timing definitions.

15. The software tool running on a programmed computer as in claim 9, wherein the generated-clock checker reports any missing generated-clock timing definitions.

16. The software tool running on a programmed computer as in claim 9, wherein reporting any waveform discrepancies includes:
    displaying actual and expected waveforms and the related logic path between the master clock and the generated-clock.

* * * * *